(12) United States Patent
Leroux

(10) Patent No.: US 12,328,479 B2
(45) Date of Patent: Jun. 10, 2025

(54) SYSTEMS AND METHODS FOR REAL-TIME PROCESSING OF LIVE MEDIA STREAMS

(71) Applicant: Shopify Inc., Ottawa (CA)

(72) Inventor: Stephan Leroux, East Gwillimbury (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 17/901,898

(22) Filed: Sep. 2, 2022

(65) Prior Publication Data
US 2024/0080529 A1    Mar. 7, 2024

(51) Int. Cl.
| | |
|---|---|
| H04N 21/47 | (2011.01) |
| G06Q 30/0601 | (2023.01) |
| G06V 20/40 | (2022.01) |
| H04N 5/268 | (2006.01) |
| H04N 21/431 | (2011.01) |
| H04N 21/472 | (2011.01) |
| H04N 23/69 | (2023.01) |

(52) U.S. Cl.
CPC ... *H04N 21/47217* (2013.01); *G06Q 30/0603* (2013.01); *G06V 20/41* (2022.01); *H04N 5/268* (2013.01); *H04N 21/431* (2013.01); *H04N 23/69* (2023.01)

(58) Field of Classification Search
None
See application file for complete search history.

(56) References Cited

U.S. PATENT DOCUMENTS

| | | | | |
|---|---|---|---|---|
| 2013/0058525 | A1* | 3/2013 | Sugio | G06T 7/248 382/103 |
| 2013/0278760 | A1* | 10/2013 | Beams | H04N 7/18 348/143 |
| 2018/0025405 | A1* | 1/2018 | Jones | G06Q 30/0643 705/26.7 |
| 2019/0141410 | A1* | 5/2019 | Zverina | H04N 21/23418 |
| 2020/0351543 | A1* | 11/2020 | Kerofsky | H04N 21/4728 |
| 2021/0136296 | A1* | 5/2021 | Kim | H04N 13/271 |

* cited by examiner

*Primary Examiner* — Samira Monshi
(74) *Attorney, Agent, or Firm* — Rowand LLP

(57) ABSTRACT

A computer-implemented is disclosed. The method includes: obtaining video data for a video stream; detecting a first object in at least one video frame of the video stream, the first object being one of a first set of defined objects associated with the video stream; and in response to detecting the first object: identifying the first object as a current target object associated with the video stream; and causing display of the current target object as an object of interest in at least one subsequent video frame of the video stream.

20 Claims, 8 Drawing Sheets

FIG. 8

SYSTEMS AND METHODS FOR REAL-TIME PROCESSING OF LIVE MEDIA STREAMS

TECHNICAL FIELD

The present disclosure relates to media streaming technologies and, in particular, to systems and methods for real-time processing of live media streams.

BACKGROUND

Livestreaming is a popular form of distributing media content to large audiences. A wide variety of content, such as social media, interactive gameplay, news coverage, etc., may be simultaneously recorded and broadcast using a livestream service. A live media stream may be initiated by a broadcaster, either spontaneously or in accordance with a defined schedule. Livestreaming typically requires source media content, encoders to digitize the content, a media publisher entity, and a content delivery network for distributing the content to viewers. Livestream content can be consumed using various different user interfaces (e.g., web browser, dedicated mobile app, etc.) on viewer computing devices.

BRIEF DESCRIPTION OF THE DRAWINGS

Embodiments will be described, by way of example only, with reference to the accompanying figures wherein:

FIG. 8 is an example of a home page of an administrator, in accordance with an example embodiment.

Like reference numerals are used in the drawings to denote like elements and features.

DETAILED DESCRIPTION OF EMBODIMENTS

Figure 1:
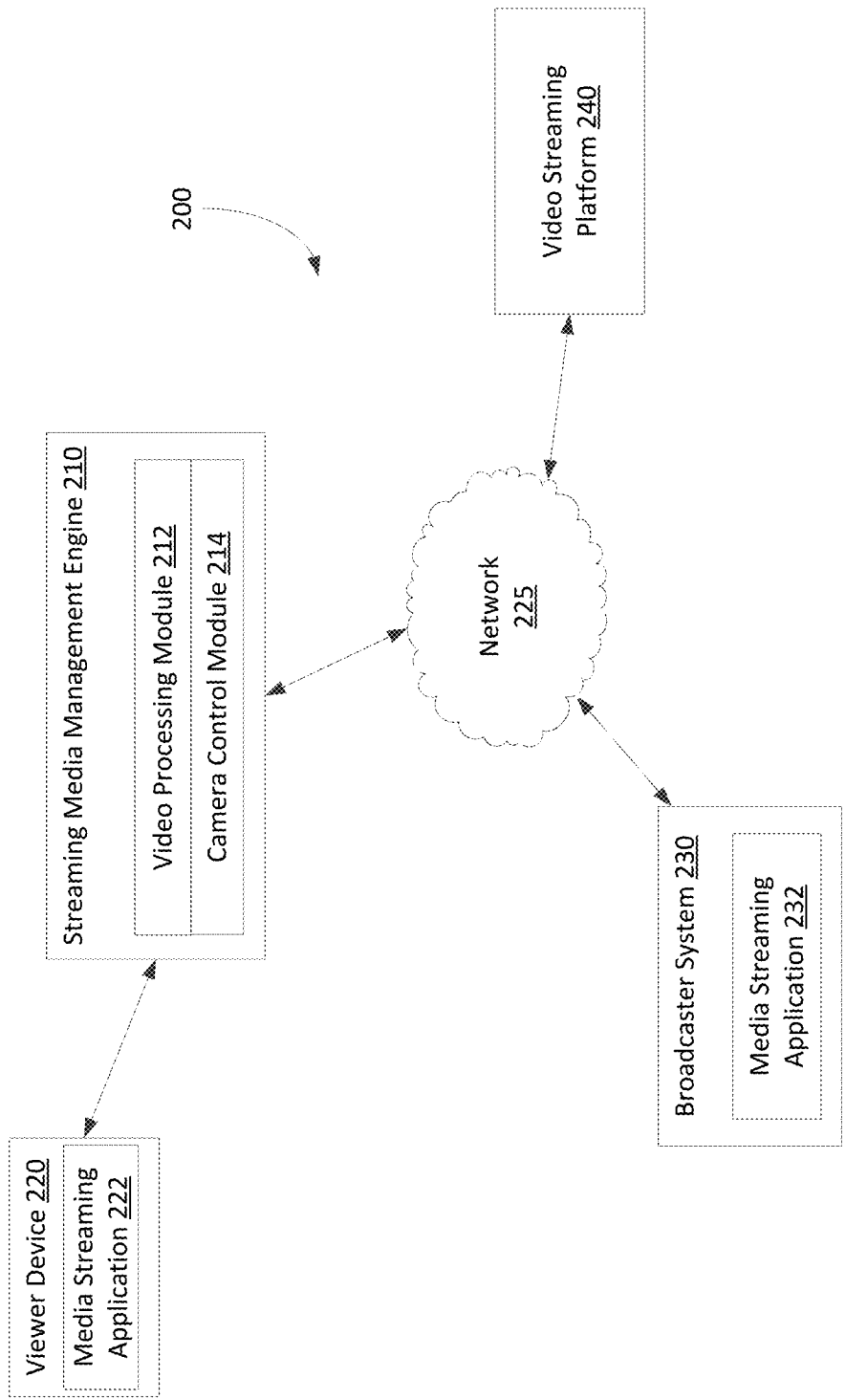
FIG. 1 illustrates an example system for processing live media streams, including a streaming media management engine.

In an aspect, the present application discloses a computer-implemented method. The method includes: obtaining video data for a video stream; detecting a first object in at least one video frame of the video stream, the first object being one of a first set of defined objects associated with the video stream; and in response to detecting the first object: identifying the first object as a current target object associated with the video stream; and causing display of the current target object as an object of interest in at least one subsequent video frame of the video stream.

In some implementations, causing display of the current target object as the object of interest may include causing transition from displaying a previous target object as the object of interest for the video stream to displaying the current target object as the object of interest for the video stream.

In some implementations, causing the transition may include at least one of: causing physical movement of an optical sensor capturing the video stream; performing one or both of a digital zoom and an optical zoom of the at least one subsequent video frame; selecting at least one optical sensor of a plurality of optical sensors for use in capturing the video stream; or graphically representing a change of the object of interest in the at least one subsequent video frame.

In some implementations, detecting the first object in the video frame may include processing video frames of the video stream using a machine learning (ML) model trained on a few-shot learning (FSL) technique.

In some implementations, the method may further include receiving, via a client device, user input of an indication of the first set of defined objects associated with the video stream, and the first set may include one or more products from a product catalogue.

In some implementations, detecting the first object in the video stream may include receiving an object identifier associated with the first object.

In some implementations, receiving the object identifier associated with the first object may include receiving user input indicating at least one of: a selection of the first object; a time-based condition for transitioning to display of the current target object as the object of interest; one or more defined keywords to detect in audio data associated with the video stream; a current object distance of the first object relative to an optical sensor capturing the video stream; or relative movement of the first object in a scene depicted in the video stream.

In some implementations, the method may further include: detecting a second object in at least one video frame of the video stream, the second object being one of the first set of defined objects associated with the video stream; determining that the second object is associated with a higher focus priority than the first object; and in response to determining that the second object is associated with the higher focus priority: setting the second object as the current target object associated with the video stream; and causing display of the current target object as the object of interest in at least one subsequent video frame of the video stream.

In some implementations, the method may further include: determining that none of the first set of defined objects is detected in a video frame of the video stream; and setting a defined default object as the current target object associated with the video stream.

In some implementations, causing display of the current target object as the object of interest may include applying a blur effect to at least a portion of the at least one subsequent video frame that does not include the current target object.

In another aspect, the present application discloses a computing system. The computing system includes a processor and a memory storing computer-executable instructions that, when executed, configure the processor to: obtain video data for a video stream; detect a first object in at least one video frame of the video stream, the first object being one of a first set of defined objects associated with the video stream; and in response to detecting the first object: identify the first object as a current target object associated with the video stream; and cause display of the current target object as an object of interest in at least one subsequent video frame of the video stream.

In another aspect, the present application discloses a non-transitory, computer-readable medium storing computer-executable instructions that, when executed by a processor, configure the processor to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "video focus" refers to a property that may attach to specific portions of a video. In particular, video focus is associated with video portions that are represented with visual emphasis. For example, an object of interest that is depicted in a video may be in video focus if the object is visually emphasized in the video. An object may be visually emphasized by, for example, adjusting the depth of field of a camera lens that is used to capture the video, applying certain visual effects (e.g., Gaussian blur filter, visual highlights, etc.) to select portions of the video, performing crop, pan, and/or zoom (i.e., digital and/or optical zoom) of the video frames, physically manipulating (or causing to be manipulated) camera optics, and the like. Video focus may be assigned to a specific portion (e.g., an object of interest) of a video, and subsequently updated to be associated with one or more different portions of the video. In particular, video focus may be "transitioned" from one object to another object. The notion of video focus is to be distinguished from, and not limited to, the concept of "optical focus" for video, which relates to control of convergence of light for image formation in video. For example, an object of interest may be in video focus (e.g., by applying an image-blurring filter) without a manipulation of camera lenses for keeping the object in optical focus in a live video stream.

In the present application, the term "product data" refers generally to data associated with products that are offered for sale on an e-commerce platform. The product data for a product may include, without limitation, product specification, product category, manufacturer information, pricing details, stock availability, inventory location(s), expected delivery time, shipping rates, and tax and tariff information. While some product data may include static information (e.g., manufacturer name, product dimensions, etc.), other product data may be modified by a merchant on the e-commerce platform. For example, the offer price of a product may be varied by the merchant at any time. In particular, the merchant may set the product's offer price to a specific value and update said offer price as desired. Once an order is placed for the product at a certain price by a customer, the merchant commits to pricing; that is, the product price may not be changed for the placed order. Product data that a merchant may control (e.g., change, update, etc.) will be referred to as variable product data. More specifically, variable product data refers to product data that may be changed automatically or at the discretion of the merchant offering the product.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and any associated payment requests, via an e-commerce platform, and the e-commerce platform may be equipped with transaction/payment processing components or delegate such processing activities to one or more third-party services. An e-commerce platform may be extendible by connecting one or more additional sales channels representing platforms where products can be sold. In particular, the sales channels may themselves be e-commerce platforms, such as Facebook Shops™, Amazon™, etc.

Live Media Streaming

Various livestream services facilitate "live selling". With live selling, products are showcased in a live social broadcast that enables audience members to interact with the streamer and with each other in real-time. For example, a streamer may promote a product (e.g., a sponsored product) by showcasing it in a live media stream and describing features of the product to the audience. Audience members may comment or ask questions, via live chat, about the featured product during the live media stream, and the streamer and/or a merchant of the product may provide responses in real-time.

In contrast to video playback, a live media stream can leverage dynamic control of video data in real-time. A streamer has control over the video content of a live media stream and can tailor the content for an audience. For example, a streamer may capture video segments that produce, or are expected to produce, a large amount of positive reaction from viewers of the live media stream. In particular, the video content may be tailored based on real-time feedback of an audience. As another example, a streamer may capture video segments that highlight certain portions of the video content. In a live selling session, the streamed video may depict one or more products and their features, such as design, size, functionalities, and the like, which may be of interest to prospective customers. The streamer may, for example, manually capture a series of product video segments, using their device (e.g., a mobile phone, camera, etc.), that is transmitted as part of a live media stream.

While manual video capture may offer streamers greater flexibility and control over video content, it is generally not a practical technique of generating a video stream for a live selling session. A streamer may be focused on content creation and thus have limited capacity to manually control a camera during livestreaming. Moreover, the quality of videos that are captured manually by the streamer may suffer (e.g., poor image stabilization, noisy images, focus hunting, etc.). Instead, the video for a live selling session is typically captured using one or more static cameras that are directed towards a scene. The video data may depict a scene that includes a streamer and various featured products, or just the streamer who gradually introduces featured products throughout the video stream.

Livestreaming systems (and related systems, such as videoconferencing platforms) that rely on the conventional static camera setup may employ various known techniques for producing visual emphasis in videos that are captured using the cameras. Certain cameras may support locking the field of view (FOV) to a person, face, or object as it moves relative to the centre of the FOV. Videoconferencing software may employ object segmentation algorithms to track faces and bodies in the foreground of a video while blurring the background. These systems are limited in that they are usually only configured to detect objects of a specific type (e.g., faces) within a session or, in some cases, track a region of pixels selected by a user. Other types of objects, such as physical products, that are featured in videos may not be adequately handled for detection and/or tracking purposes. Further, these systems offer limited ability to transition focus, i.e., visual emphasis, or tracking between objects of interest that are depicted in videos. In the live selling context, it may be desired to shift visual emphasis between different products that are featured in a video (or between a product and the streamer's form) such that the streamer may present relevant product information when the products are shown in focus in the video.

The present application discloses solutions for addressing some of the aforementioned technical limitations of conventional livestreaming systems. Specifically, a system for dynamically managing video focus in a live media stream is described. The system is configured to automatically adjust video settings to visually emphasize objects, such as featured products, that are depicted in a livestreamed video. The system may be suitable for processing video data in various different applications including, but not limited to, live selling. For example, during a live selling session, the video focus may initially default to the presenter/streamer captured in the camera's field of view. The system can detect when to shift the video focus from the current subject (i.e., the presenter) to one or more featured products that are depicted in the video. The video focus may subsequently be returned to the presenter or transitioned to one or more other products that are featured in the live selling session.

The system receives initial input of a selection of products ("featured products") that are to be featured in a live selling session. For example, a merchant may select one or more items from the merchant's product catalogue that will be featured. The system obtains product data (e.g., product category, color, etc.) associated with the selected products. In some embodiments, the merchant may upload images and/or videos of the selected products that are scheduled to be presented during the live selling session. The uploaded product data may be used as inputs to a trained object detection model such as a machine learning (ML) model trained using few-shot learning (FSL).

The system processes video data of the live media stream and determines where to set the video focus in the camera's field of view. A default object (e.g., the presenter's face) may be set as an initial object of interest for the video. In particular, when the presenter is speaking without any scheduled products in the camera's FOV, the presenter's form may be in focus (or otherwise visually emphasized).

The presenter may subsequently bring a featured product into the FOV, for example, by holding up the product or otherwise drawing attention to the product (e.g., pointing or gesturing toward the product). Upon detecting a featured product in a video frame, the system sets the detected product as the current target object associated with the video stream and causes display of the current target object as an object of interest in subsequent video frames of the video stream. In some embodiments, the system may cause the camera to automatically pan to center the detected product in the FOV. The video stream is continuously processed, and the system determines whether the video focus should be returned to the default object, i.e., the presenter's face. That is, when no featured products are detected in the FOV, the system may automatically set the default object as the object of interest for the video.

In the case of multiple products featured concurrently in a video stream, the system may visually emphasize two or more of the products or it may set a single one of the featured products as the object of interest. The transition from displaying a previous target object as the object of interest may occur based on various factors or cues, such as:

Manual input of the presenter: the presenter may select, via a user interface, one or more detected products in a current video frame of a video stream for setting the video focus.

Time-based: video focus may be adjusted based on a predefined schedule associated with the live selling session; the schedule may indicate specific times for adjusting video focus or length of time for maintaining video focus on each of one or more featured products.

Audio cues: the system may process the presenter's speech in the audio stream and use defined trigger words or phrases to initiate change of video focus.

Depth information: the system may prioritize setting video focus on objects that are determined to be closer to the camera or to some defined reference location.

Object movement: the system may prioritize setting video focus on objects that are associated with greater amount of movement (e.g., shaking, turning, or otherwise movement of the object by the presenter).

Reference is first made to FIG. 1, which illustrates, in block diagram form, an example system 200 for processing live media streams. As shown in FIG. 1, the system 200 may include viewer devices 220, a broadcaster system 230, a video streaming platform 240, and a network 225 connecting one or more of the components of system 200.

As illustrated, the viewer devices 220 and the broadcaster system 230 communicate via the network 225. In at least some embodiments, each of the viewer devices 220 and the broadcaster system 230 may be a computing device. The viewer devices 220 and the broadcaster system 230 may take a variety of forms including, for example, a mobile communication device such as a smartphone, a tablet computer, a wearable computer (such as a head-mounted display or smartwatch), a laptop or desktop computer, or a computing device of another type.

The broadcaster system 230 is associated with a broadcaster (or streamer). In particular, the broadcaster system 230 enables a broadcaster to initiate streaming of media content to one or more viewers. In at least some embodiments, the broadcaster system 230 may have resident thereon a media streaming application 232. The media streaming application 232 may be a standalone application (e.g., a mobile app) or a web-based application. A broadcaster can launch the media streaming application 232 on the broadcaster system 230 and initiate a live media (e.g., audio, video, etc.) stream. The live media stream may be transmitted directly to viewer devices 220. Alternatively, the live media stream may be transmitted to an intermediary video streaming platform 240. In some embodiments, the video streaming platform 240 may be a social networking system, and the media streaming application 232 may be a social networking application for gaining access to a social network. The broadcaster system 230 may communicate with servers of the video streaming platform 240 via the media streaming application 232. The video streaming platform 240 may, in turn, transmit the live media stream to viewer devices 220. The media streaming application 232 may include various monitoring and management functionalities involved in producing a live media stream. By way of example, the broadcaster may control transmission settings for a live media stream, manage viewer permissions, and monitor audience reactions using the media streaming application 232.

In at least some embodiments, the broadcaster system 230 includes one or more cameras for capturing video data. The cameras may, for example, be standalone cameras used to capture scenes that include, at least, the broadcaster. The captured video data may be transmitted directly from the cameras to an e-commerce platform (e.g., for processing by the streaming media management engine 210) or the video streaming platform 240. Additionally, or alternatively, the broadcaster system 230 may comprise a computing device that integrates one or more cameras for video capture. For example, the broadcaster may manually capture video using a personal device, such as a mobile phone, that is equipped with cameras, and upload the video as part of a live media stream. The video may be uploaded, for example, using the media streaming application 232.

The viewer devices 220 are associated with viewers of a live media stream. Viewers may access a live media stream using a media streaming application 222, which may be stand-alone application or a web-based application. For example, live media streams may be viewed using a web browser, a social networking application, a media playback application, or the like. Viewer devices 220 may communicate directly with the broadcaster system 230, or they may communicate with servers of a video streaming platform 240.

The video streaming platform 240 provides a platform for sharing content by means of streams of video data, including live media streams. The video streaming platform 240 may comprise servers that are configured to receive and transmit live media streams. In at least some embodiments, the video streaming platform 240 may be a social networking system. In particular, the video streaming platform 240 may be a computing system that can host an online social network. Users may access the social network to broadcast content to other users or to view content that is steamed by other users. For example, the video streaming platform 240 may provide a website or software (e.g., a social media app) that enables users to initiate or view a live media stream. The video streaming platform 240 receives digitally encoded data representing live media streams from broadcaster systems 230, and viewer devices 220 access servers of the video streaming platform 240 to receive transmission of the encoded video stream data.

A streaming media management engine 210 is provided in the system 200. The streaming media management engine 210 may be a software-implemented module containing processor-executable instructions that, when executed by one or more processors, cause a computing system to carry out some of the processes and functions described herein. In some embodiments, the streaming media management engine 210 may be provided as a stand-alone service. In particular, a computing system may engage the streaming media management engine 210 as a service that facilitates processing of live media streams.

The streaming media management engine 210 is configured to receive video and audio data for live media streams. In particular, the streaming media management engine 210 may be communicably connected to one or more broadcaster systems 230. For example, the broadcaster system 230 may transmit live media stream data directly to the streaming media management engine 210, or live media stream data may be received at the streaming media management engine 210 via an intermediary system, such as the video streaming platform 240.

In accordance with one or more disclosed embodiments, the streaming media management engine 210 may facilitate customization of live media streams for individual viewers. For example, the streaming media management engine 210 may transmit modified versions of an original live media stream to viewer devices. That is, the media (e.g., audio, video, etc.) data of the live media stream may be modified by the streaming media management engine 210 prior to transmission to viewers. Additionally, or alternatively, the streaming media management engine 210 may transmit the original stream with instructions on how to modify the stream on the client-side (i.e., at the viewer device) prior to providing the stream to a viewer. For example, the streaming media management engine 210 may be configured to provide customized overlay content that is transmitted with an original live media stream to viewer devices.

By way of further example, the streaming media management engine 210 may be configured to provide instructions for controlling the user interfaces through which live media streams are presented. Specifically, customized instructions for controlling different types of user interfaces (e.g., web browser, mobile streaming application, social media application, etc.) for livestreaming may be generated by the streaming media management engine 210 (or components thereof) for transmission, either directly or via a third-party server/system, to viewer devices 220. In particular, the instructions may be stream-specific; that is, the instructions may relate to a specific live media stream and thus enable control of user interfaces during presentation (either live or playback) of said live media stream. Suitable applications on the viewer devices 220 can process the instructions in order to control the associated user interfaces, for example, when presenting the relevant live media stream.

The streaming media management engine 210 includes a video processing module 212. The video processing module 212 performs operations for processing the video data associated with live media streams. The video processing module 212 may receive live video feed from various sources (e.g., video mixers, broadcaster systems, etc.). The live video feed may be in a compressed or uncompressed format. The video processing module 212 may supply the live video feed to a plurality of video encoders that compress the live video feed using one or more codecs (e.g., MPEG-2, H. 264, etc.).

The video processing module 212 may perform analysis of the video content associated with a live media stream. In some embodiments, the video processing module 212 may perform object detection in the live media stream. In particular, the video processing module 212 may implement detection of objects (e.g., persons, physical objects, etc.) and associated features and actions, in real-time, based on analysis of video data of the live media stream. The video processing module 212 may, for example, include an objection detection sub-module.

The streaming media management engine 210 also includes a camera control module 214. The camera control module 214 is configured to generate instructions for controlling cameras associated with the broadcaster system 230. Specifically, the camera control module 213 may generate control signals for cameras that are used in producing video data of a live media stream. The control signals may comprise instructions for manipulating one or more of the cameras, for example, to ensure that certain object(s) stay within the cameras' field of view. The cameras may be caused to perform certain movements or operations such as panning, tilting, zooming, etc., based on instructions relayed by the camera control module 214.

The streaming media management engine 210, the viewer devices 220, the broadcaster system 230, and the video streaming platform 240 may be in geographically disparate locations. Put differently, the viewer devices 220 may be remote from one or more of: streaming media management engine 210, the broadcaster system 230, and the video streaming platform 240. As described above, the viewer devices 220, the broadcaster system 230, the streaming media management engine 210, and the video streaming platform 240 may be computing systems.

The network 225 is a computer network. In some embodiments, the network 225 may be an internetwork such as may be formed of one or more interconnected computer networks. For example, the network 225 may be or may include an Ethernet network, an asynchronous transfer mode (ATM) network, a wireless network, or the like.

In some example embodiments, the streaming media management engine 210 may be integrated as a component of an e-commerce platform. That is, an e-commerce platform may be configured to implement example embodiments of the streaming media management engine 210. More particularly, the subject matter of the present application, including example methods for controlling a user interface for presentation of live media streams disclosed herein, may be employed in the specific context of e-commerce.

Figure 2:
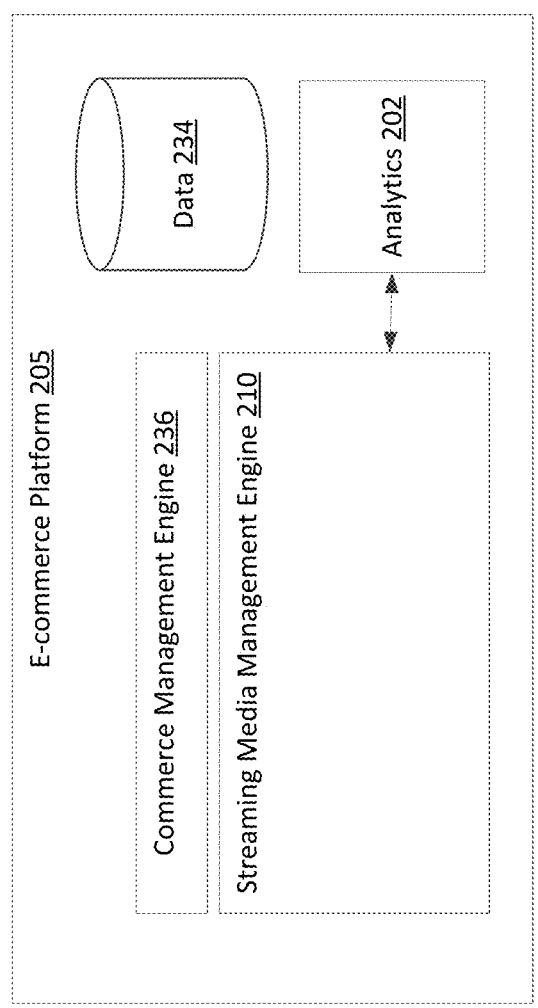
FIG. 2 is a block diagram of an e-commerce platform that is configured for implementing example embodiments of the streaming media management engine of FIG. 1.

Reference is made to FIG. 2 which illustrates an example embodiment of an e-commerce platform 205 that implements a streaming media management engine 210. The viewer devices 220 and the broadcaster system 230 may be communicably connected to the e-commerce platform 205. In at least some embodiments, the viewer devices 220 and the broadcaster system 230 may be associated with accounts of the e-commerce platform 205. Specifically, the viewer devices 220 and the broadcaster system 230 may be associated with entities (e.g., individuals) that have accounts in connection with the e-commerce platform 205. For example, one or more viewer devices 220 and broadcaster system 230 may be associated with customers (e.g., customers having e-commerce accounts) or merchants having one or more online stores in the e-commerce platform 205. The e-commerce platform 205 may store indications of associations between viewer/broadcaster systems and merchants or customers of the e-commerce platform, for example, in the data facility 134.

The e-commerce platform 205 includes a commerce management engine 236, a streaming media management engine 210, a data facility 234, and a data store 202 for analytics relating to streaming media. The commerce management engine 236 may be configured to handle various operations in connection with e-commerce accounts that are associated with the e-commerce platform 205. For example, the commerce management engine 236 may be configured to retrieve e-commerce account information for various entities (e.g., merchants, customers, etc.) and historical account data, such as transaction events data, browsing history data, and the like, for selected e-commerce accounts. In particular, the commerce management engine 236 may obtain account information for e-commerce accounts of viewers and/or broadcasters of live media streams that are associated with the e-commerce platform 205.

The functionality described herein may be used in commerce to provide improved customer or buyer experiences.

The e-commerce platform 205 may implement the functionality for any of a variety of different applications, examples of which are described herein. Although the streaming media management engine 210 of FIG. 2 is illustrated as a distinct component of the e-commerce platform 205, this is only an example. An engine could also or instead be provided by another component residing within or external to the e-commerce platform 205. In some embodiments, one or more applications that are associated with the e-commerce platform 205 may provide an engine that implements the functionality described herein to make it available to customers and/or to merchants. Furthermore, in some embodiments, the commerce management engine 236 may provide that engine. However, the location of the streaming media management engine 210 may be implementation specific. In some implementations, the streaming media management engine 210 may be provided at least in part by an e-commerce platform, either as a core function of the e-commerce platform or as an application or service supported by or communicating with the e-commerce platform. Alternatively, the streaming media management engine 210 may be implemented as a stand-alone service to clients such as a customer device or a merchant device. In addition, at least a portion of such an engine could be implemented in the merchant device and/or in the customer device. For example, a customer device could store and run an engine locally as a software application.

The streaming media management engine 210 is configured to implement at least some of the functionality described herein. Although the embodiments described below may be implemented in association with an e-commerce platform, such as (but not limited to) the e-commerce platform 205, the embodiments described below are not limited to e-commerce platforms.

In some embodiments, the streaming media management engine 210 may allow for associating a live media stream with e-commerce accounts of the e-commerce platform 205. For example, the streaming media management engine 210 may determine that a broadcaster of a live media stream is associated with a merchant of the e-commerce platform 205. The broadcaster may themselves be a seller (e.g., a gamer selling gameplay-related merchandise, a social media influencer selling branded products, etc.), the broadcaster may specify a merchant for whom content is streamed (e.g., a social media influencer showcasing a product of a merchant sponsor), or a merchant can specify a broadcaster for whom approval is granted to feature their product in a live media stream. The streaming media management engine 210 may associate the live media stream with the merchant. As another example, the streaming media management engine 210 may determine that one or more viewers of a live media stream are associated with customer accounts on the e-commerce platform 205. The streaming media management engine 210 may associate the live media stream with e-commerce accounts of those customers that view the live media stream.

In at least some embodiments, the camera control module 214 cooperates with the video processing module 212 to facilitate control of cameras that are used for generating video of live media streams. The camera control module 214 may be configured to provide, to broadcaster systems, instructions for controlling the movement and/or operations of cameras that are used in connection with a live media stream. As will be described in greater detail below, the instructions for controlling the cameras may be generated based on detection and tracking of objects of interest that are depicted in video data associated with a live media stream.

The data facility 234 may store data collected by the e-commerce platform 205 based on the interaction of merchants and customers with the e-commerce platform 205. For example, merchants provide data through their online sales activity. Examples of merchant data for a merchant include, without limitation, merchant identifying information, product data for products offered for sale, online store settings, geographical regions of sales activity, historical sales data, and inventory locations. Customer data, or data which is based on the interaction of customers and prospective purchasers with the e-commerce platform 205, may also be collected and stored in the data facility 234. Such customer data is obtained on the basis of inputs received via customer devices associated with the customers and/or prospective purchasers. By way of example, historical transaction events data including details of purchase transaction events by customers on the e-commerce platform 205 may be recorded and such transaction events data may be considered customer data. Such transaction events data may indicate product identifiers, date/time of purchase, final sale price, purchaser information (including geographical region of customer), and payment method details, among others. Other data vis-à-vis the use of e-commerce platform 205 by merchants and customers (or prospective purchasers) may be collected and stored in the data facility 234.

The data facility 234 may include customer preference data for customers of the e-commerce platform 205. For example, the data facility 234 may store account information, order history, browsing history, and the like, for each customer having an account associated with the e-commerce platform 205. The data facility 234 may additionally store, for a plurality of e-commerce accounts, wish list data and cart content data for one or more virtual shopping carts.

Figure 3:
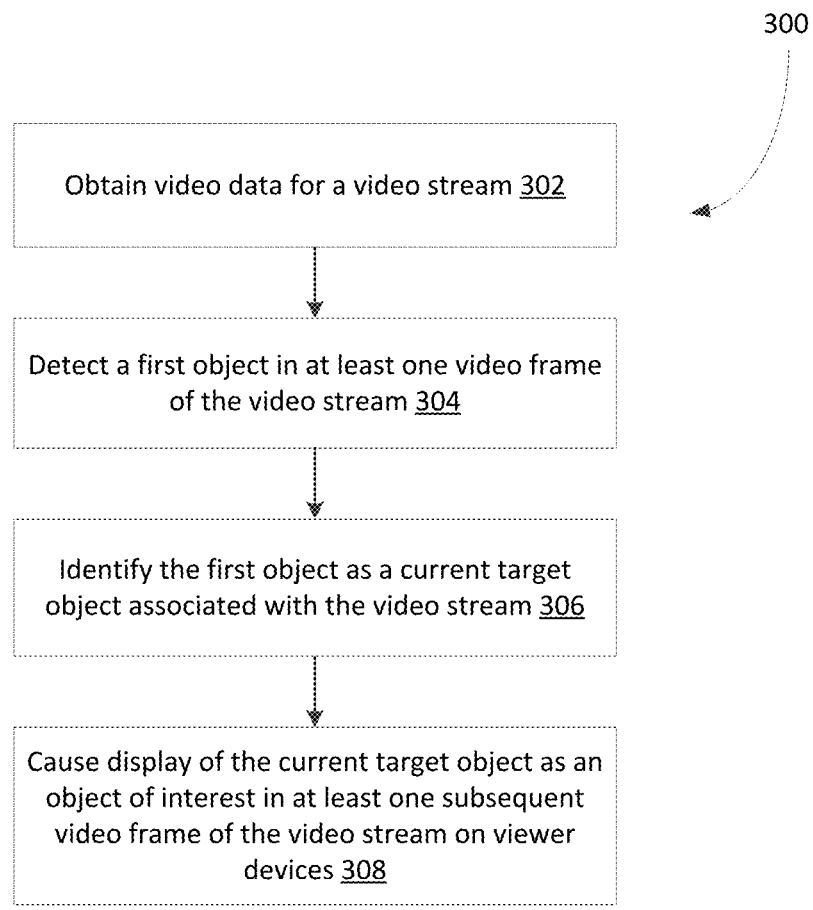
FIG. 3 shows, in flowchart form, an example method for real-time processing of a video of a live media stream.

Reference is now made to FIG. 3, which shows, in flowchart form, an example method 300 for real-time processing of a video of a live media stream. The method 300 may be performed by a computing system that implements media stream processing, such as the streaming media management engine 210 of FIG. 1. As detailed above, the streaming media management engine may be a service that is provided within or external to an e-commerce platform. The streaming media management engine may implement the operations of method 300 for managing video focus in live video streams.

In operation 302, the streaming media management engine obtains video data associated with a live video stream. The video data may be transmitted by a computing device associated with a broadcaster. In some embodiments, the video data may be transmitted directly from the broadcaster system to the streaming media management engine. Alternatively, the streaming media management engine may receive the video data from a video broadcasting system, such as the servers of an online social network. The live video stream may be broadcast by a user of the social network, and the video data may be transmitted from the social network servers for delivery to viewer devices associated with other users of the social network.

The streaming media management engine receives the video data prior to delivery of the live video stream to viewers. That is, for one or more viewers of a live video stream, i.e., viewers that request to access a live video stream, the streaming media management engine may process the video data of the live video stream prior to delivery of the stream content to the viewers. In particular, the streaming media management engine is configured to receive and process original video data for a live video stream in real-time.

In operation 304, the streaming media management engine detects a first object in at least one video frame of the live video stream. Specifically, the streaming media management engine processes video frames of video associated with the live video stream and performs object detection in real-time using the video frames. The streaming media management engine may employ one or more object recognition and/or detection algorithms for detecting the first object. In some embodiments, the video frames may be processed using a machine learning model. In particular, the streaming media management engine may implement a suitable machine learning model for video object detection. By way of example, a machine learning model trained using a few-shot learning (FSL) technique may be employed in performing the video object detection.

The first object may be one of a predefined set of objects that are associated with the live video stream. In particular, the objects may include one or more products that are designated to be featured in video of the live video stream, and the first object may be one of the designated products. A broadcaster (e.g., a merchant) may select certain products to present during a live selling session and indicate the selection of products prior to initiating the live video stream. The products may, for example, be selected from a product catalogue of a merchant. The selected products may be used for training the relevant machine learning model. For example, a merchant may upload images, videos, etc., of one or more products that are scheduled for sale in a live selling session, and the uploaded media data may be used as inputs for a FSL object detection model.

The video data of the live video stream is continuously parsed by the streaming media management engine. Specifically, the video frames of the video stream are analyzed using object detection models that are trained to detect the presence of specific objects associated with the video. Once the first object is detected based on video analysis, the streaming media management engine identifies the first object as a current target object associated with the live video stream, in operation 306. That is, the newly detected first object is set as the current target object for the live video stream. A target object represents an object that is designated for receiving video focus in a video stream, i.e., a "target" of video focus. In at least some embodiments, only those objects that are identified as target objects may be caused to be displayed in video focus, or as "objects of interest", for a video. In particular, only target objects may be represented with visual emphasis throughout a video stream. By identifying and tracking current target objects for a video, the streaming media management engine may determine which object is to be displayed in video focus at any given time.

In at least some embodiments, the streaming media management engine is configured to track objects that are detected in the video stream and identified as objects of interest. In particular, the streaming media management engine may track the position of detected objects of interest in video frames of the video stream. For example, in a live selling session, responsive to detecting one or more featured products, the streaming media management engine may track the detected products throughout the video stream. The streaming media management engine may track and maintain various information relating to the detected objects of interest, such as object identifiers, time of detection, current position and/or orientation, target object status (i.e., whether the object is a current target object), and the like.

In operation 308, the streaming media management engine causes display of the current target object as an object of interest in at least one subsequent video frame of the video stream on viewer devices. In particular, the streaming media management engine may cause a video to transition from displaying a previous target object as an object of interest for the video stream to displaying the current target object as the object of interest.

The transition of video focus to a new object of interest, e.g., a current target object, may occur in response to various transition cues which may be detected by the streaming media management engine. In some embodiments, a user, such as an operator of a live video stream, may input selection of a new current target object. As video data is processed, the streaming media management engine may maintain a list of objects of interest that are detected in a video stream. The list may be presented, for example, on a user interface (e.g., a navigable menu), and the user may access the user interface on their computing device. The UI may be updated frame-by-frame as the video stream is processed. That is, the UI may indicate, for each of one or more video frames, the objects of interest that are detected in the video frame. The user may, using their device, select one of the listed objects of interest for a video frame to set as the current target object.

In some embodiments, a transition cue may be time-based. A merchant, prior to a live selling session, may schedule transitions of video focus to occur at specific times. For example, the merchant may specify products to be featured in the live video stream and times at which the respective products are to be in video focus. The transitions may be set to occur at defined times (e.g., 3 pm, Eastern Standard Time), or relative to a certain reference time (e.g., a start time for the live video stream, a time when the first object is detected in the video, etc.).

In some embodiments, a transition cue may be audio-based. The streaming media management engine may process audio data associated with the live video stream and perform speech recognition based on the audio data. Specifically, the streaming media management engine may identify one or more keywords in speech detected in the audio data. The keywords may be words that are included in a set of defined terms associated with the live media stream. That is, the streaming media management engine may store or have access to a definition of terms which may be used in keyword recognition, i.e., identifying keywords in utterances of the speaker. In at least some embodiments, the defined terms may include product descriptors of various different types of products. Examples of product descriptors include terms that are commonly used to describe variable attributes of products, such as size, color, shapes, etc., and labels that are indicative of level or quality of product (e.g., standard, premium, deluxe, etc.).

The streaming media management engine may adapt one or more of various techniques for keyword detection, such as a matching algorithm based on dynamic time warping (DTW) or embedded learning, a time delay neural network, and a trained large-vocabulary continuous speech recognition (LVCSR) system.

The keywords detected are those instances of one or more of the defined terms in audio segments that are temporally proximate to the video frame(s) in which the first object is detected. In particular, the streaming media management engine is configured to detect instances of the keywords in audio segments that immediately precede or follow the points in the live media stream at which the streaming media management engine detects the first object in the video data. In at least some embodiments, the streaming media management engine may first verify that the audio and video of the live media stream are synchronized. Upon confirming audio-to-video synchronization, the streaming media management engine may process only the audio segments corresponding to video segments that are associated with a time period either immediately preceding or following the timestamps of video frame(s) in which the first object is detected. The time period may, for example, be a predefined threshold length of time. Only the keywords detected in these select audio segments may be used for further processing, i.e., transition of video focus.

In some embodiments, a transition of video focus may occur based on depth information. For example, the streaming media management engine may be configured to visually emphasize objects positioned closer to the cameras that are used for the live video stream (or to some predefined reference point). The video focus of the video stream may thus transition from one object of interest to another object of interest having a smaller subject distance to the cameras.

In some embodiments, a transition of video focus may occur based on movements of objects of interest. The streaming media management engine may be configured to visually emphasize objects that are associated with the greatest amount of movement. For example, the broadcaster may be holding different products in each hand. The broadcaster may naturally shake, turn, or otherwise move the product that they are presently describing. The streaming media management engine would detect the increase in motion of an object as a cue to automatically transition focus to the object.

The display of a target object as an object of interest, i.e., the visual effect of video focus, in video frames of a live video stream may be produced in a number of ways. In at least some embodiments, the streaming media management engine may be configured to cause physical movement of one or more optical sensors capturing the video stream. Specifically, an image of an object of interest may be made clearer/sharper based on control of camera optics used for capture of the video stream. For example, a depth of field of a camera lens may be caused to be adjusted. The streaming media management engine may generate control signals comprising instructions for adjusting camera optics and/or settings of the cameras that are associated with the live video stream. Additionally, or alternatively, at least one of the cameras may be caused to pan to centre an object of interest in its field of view. For example, a camera producing the video stream may pan to centre a featured product (or otherwise an object of interest) in a field of view of the camera, responsive to control signals relayed by the streaming media management engine.

In some embodiments, the streaming media management engine may cause to be performed certain camera effects such as crop, pan, and/or zoom (e.g., a digital zoom, an optical zoom, etc.) on one or more video frames. In particular, the one or more video frames may be digitally altered to simulate effects of crop, pan, and/or zoom. For example, the streaming media management engine may produce a zoom-in/-out or an image crop effect to ensure that the object of interest stays within the field of view. The streaming media management engine may, in some embodiments, select at least one optical sensor of a plurality of optical sensors for use in capturing the video stream.

In some embodiments, the streaming media management engine may graphically represent a change of the object of interest in a subsequent video frame. In particular, one or more video frames of the video stream may be digitally modified prior to transmission to viewer devices. For example, the streaming media management engine may apply certain visual effects or filters (e.g., an image-blurring filter, visual highlights, addition of UI elements, etc.) to portions of the video frame(s).

Figure 4:
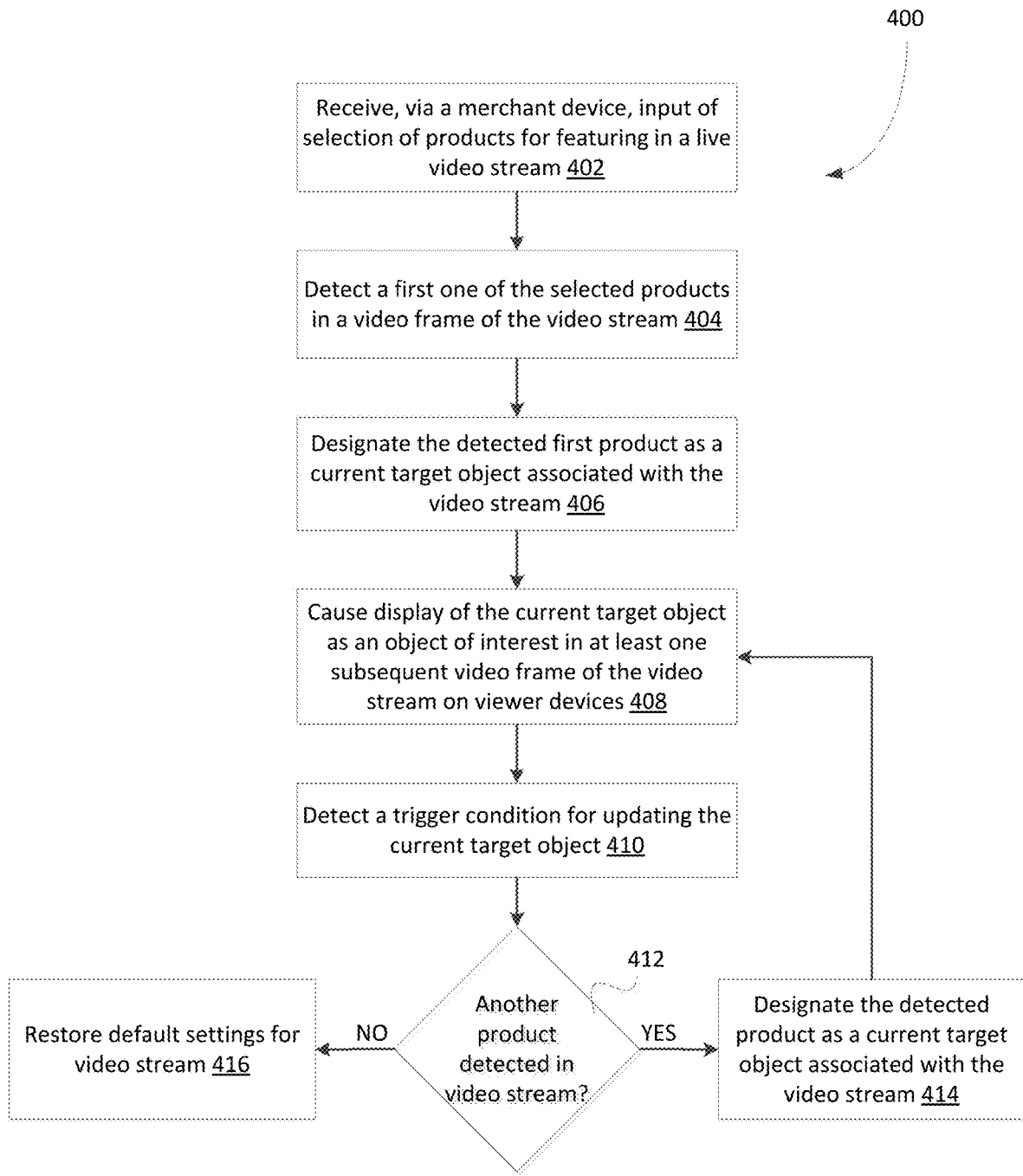
FIG. 4 shows, in flowchart form, another example method for real-time processing of a video of a live media stream.

Reference is now made to FIG. 4, which shows, in flowchart form, another example method 400 for real-time processing of a video of a live media stream. The method 400 may be performed by a computing system that implements media stream processing, such as the streaming media management engine 210 of FIG. 1. The streaming media management engine may implement the operations of method 400 for managing video focus in live video streams. In particular, the method 400 may facilitate controlling video focus in a live selling session. The operations of method 400 may be performed in addition to, or as alternatives of, one or more operations of method 300.

In operation 402, the streaming media management engine receives, via a merchant or broadcaster device, input of selection of products for featuring in a live video stream. The selected products may include those products that are desired to be presented by the broadcaster during a live selling session.

The video data of the live video stream is analyzed using an object detection model. In particular, the streaming media management engine is configured to continuously parse the input video stream to detect one or more of the featured products for the live selling session. In operation 404, the streaming media management engine detects a first one of the selected products in a video frame of the video stream. For example, the streaming media management engine may process a video frame depicting a scene that includes the broadcaster pointing to, holding up, or otherwise gesturing toward a featured product.

After detecting the first product, the streaming media management engine designates the detected first product as a current target object associated with the video stream, in operation 406. That is, the first product is set as the next object to visually emphasize in the video stream. In operation 408, the streaming media management engine causes display of the current target object as an object of interest in at least one subsequent video frame of the video stream on viewer devices. In particular, the current target object may be represented with visual emphasis such that it is in video focus, in accordance with example embodiments of video focus described above.

In operation 410, the streaming media management engine detects a trigger condition for updating the current target object. Specifically, a trigger condition for initiating a change of the current target object is detected. The trigger condition may, in some embodiments, be a transition cue for shifting video focus of the video stream. For example, the trigger condition may be any one of the transition cues described with reference to method 300.

Once a trigger condition is detected, the streaming media management engine determines whether another featured product is detected in the video stream, in operation 412. For example, if a featured product had been detected in one or more previous video frames or is detected in at least one subsequent video frame, the streaming media management engine may determine that another featured product is to be represented with visual emphasis. Upon detecting such featured product, the streaming media management engine designates the detected product as the new current target object for the video stream (operation 414) and causes display of the product as an object of interest, in operation 408.

If, on the other hand, no other products are detected in the video stream (i.e., in previous or subsequent video frames), the streaming media management engine may restore default settings for the video stream, in operation 416. In particular, the visual emphasis may be removed from the most recently designated current target object. For example, the broadcaster may remove the last featured products from the FOV of cameras for the live video stream, and video focus may be shifted from said products accordingly. In at least some embodiments, the video focus may be transitioned to a defined default object (e.g., the broadcaster's face/body). A default object may be defined for a live video stream, and the video focus may be set to return to the default object when there are no other objects of interest in the video stream. The streaming media management engine may determine that no other featured product is detected in video frames of the video stream and in response, a default object may be set as the current target object associated with the video stream.

Figure 5:
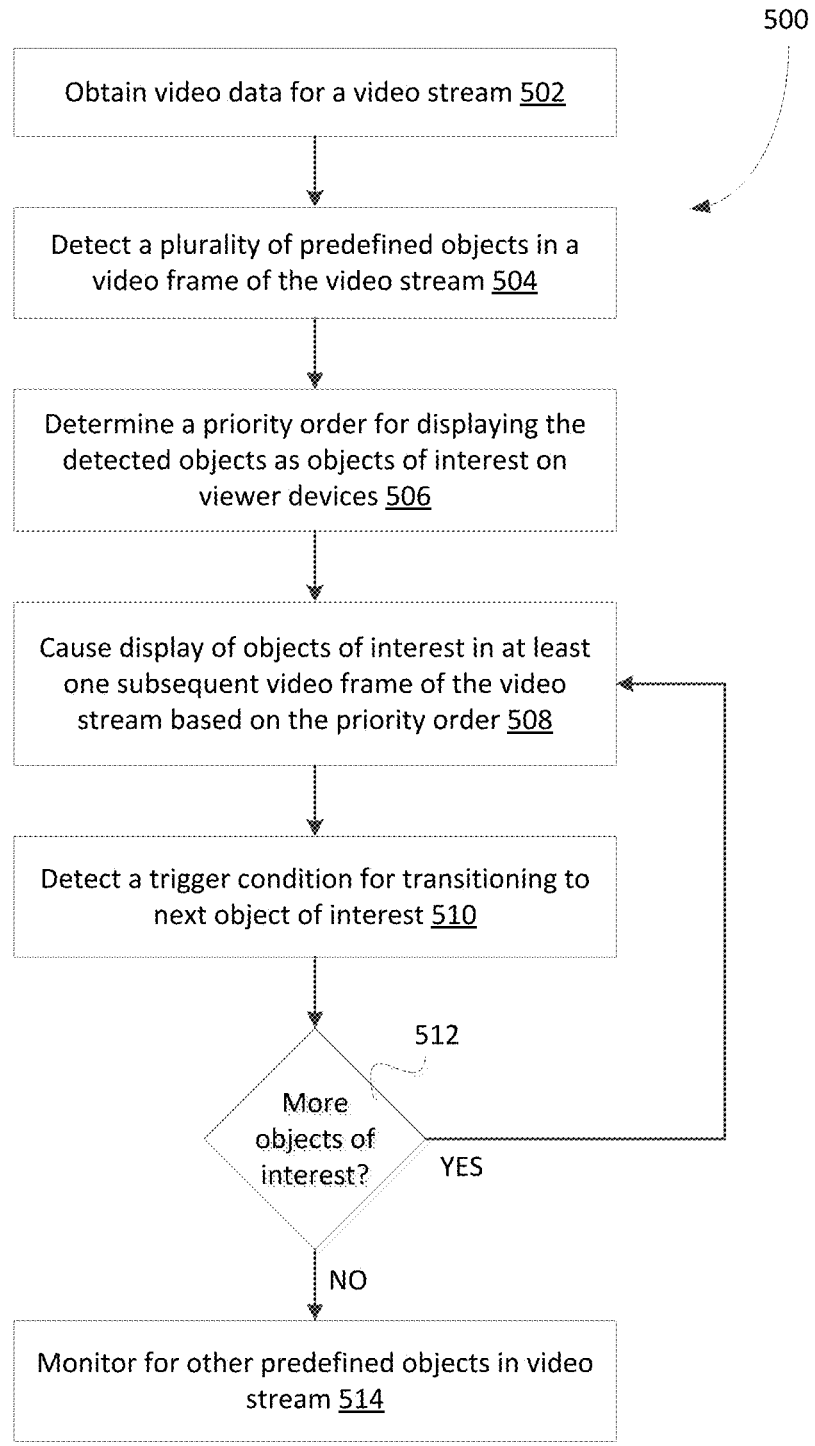
FIG. 5 shows, in flowchart form, an example method for controlling display of objects of interest in a video of a live media stream.

Reference is now made to FIG. 5, which shows, in flowchart form, an example method 500 for controlling display of objects of interest in a video of a live media stream. The method 500 may be performed by a computing system that implements media stream processing, such as the streaming media management engine 210 of FIG. 1. In particular, the method 400 may facilitate controlling transition of video focus in a live selling session. The operations of method 500 may be performed in addition to, or as alternatives of, one or more of the operations of methods 300 and 300.

In operation 502, the streaming media management engine obtains video data for a video stream. The video data may be transmitted by a computing device associated with a broadcaster. The streaming media management engine receives the video data prior to delivery of the live video stream to viewers.

In operation 504, the streaming media management engine detects a plurality of predefined objects in a video frame of the video stream. Specifically, the streaming media management engine processes video frames of video associated with the live video stream and performs object detection using the video frames. In some embodiments, the video frames may be processed using a machine learning model. That is, the streaming media management engine may implement a suitable machine learning model for video object detection. By way of example, a machine learning model trained using a few-shot learning (FSL) technique may be employed in performing the video object detection.

Upon detecting a plurality of the predefined objects in a single video frame (i.e., a single depicted scene), the streaming media management engine determines a priority order for displaying the detected objects as objects of interest on viewer devices, in operation 506. By way of example, the streaming media management engine may detect a first featured product and a second featured product in the same video frame. In such instances, the streaming media management engine may determine which of the first and second featured products should be prioritized for video focus (i.e., represented with visual emphasis) before the other one of the products. In some embodiments, the streaming media management engine may assign, to each of the detected products, a priority value representing a relative focus priority of the product in the depicted scene of the video frame. The priority value for a detected object in a video frame may be determined based on various factors such as, but not limited to, object's distance from the cameras, amount of relative movement of the object, number of recognized keywords relating to the object, video stream schedule, and the like.

In operation 508, the streaming media management engine causes display of objects of interest in at least one subsequent video frame of the video stream based on the priority order. Specifically, a detected object having a higher priority value may be prioritized for display in video focus over other detected objects having lower priority values. The higher priority object may be displayed as the sole object of interest until some trigger condition (e.g., trigger keyword, scheduled transition, etc.) is detected for transitioning the video focus to another one of the detected objects (operation 510).

If the streaming media management engine determines that there are more objects of interest (operation 512), the method proceeds to operation 508 to cause display of further objects of interest in subsequent video frames. Otherwise, the streaming media management engine monitors for other predefined objects in the video stream, in operation 514.

Figure 6A:
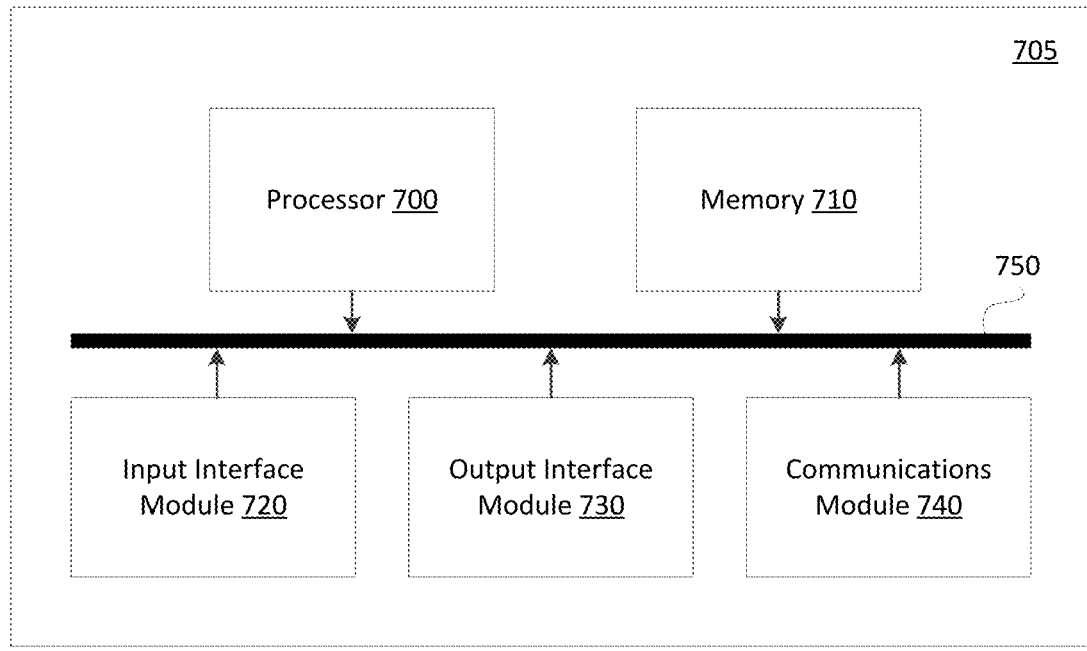
FIG. 6A is a high-level schematic diagram of a computing device.

The above-described methods may be implemented by way of a suitably programmed computing device. FIG. 6A is a high-level operation diagram of an example computing device 705. The example computing device 705 includes a variety of modules. For example, as illustrated, the example computing device 705, may include a processor 700, a memory 710, an input interface module 720, an output interface module 730, and a communications module 740. As illustrated, the foregoing example modules of the example computing device 705 are in communication over a bus 750.

The processor 700 is a hardware processor. The processor 700 may, for example, be one or more ARM, Intel x86, PowerPC processors or the like.

The memory 710 allows data to be stored and retrieved. The memory 710 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 705.

The input interface module 720 allows the example computing device 705 to receive input signals. Input signals may, for example, correspond to input received from a user. The input interface module 720 may serve to interconnect the example computing device 705 with one or more input devices. Input signals may be received from input devices by the input interface module 720. Input devices may, for example, include one or more of a touchscreen input, keyboard, trackball or the like. In some embodiments, all or a portion of the input interface module 720 may be integrated with an input device. For example, the input interface module 720 may be integrated with one of the aforementioned examples of input devices.

The output interface module 730 allows the example computing device 705 to provide output signals. Some output signals may, for example allow provision of output to a user. The output interface module 730 may serve to interconnect the example computing device 705 with one or more output devices. Output signals may be sent to output devices by output interface module 730. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 730 may be integrated with an output device. For example, the output interface module 730 may be integrated with one of the aforementioned example output devices.

The communications module 740 allows the example computing device 705 to communicate with other electronic devices and/or various communications networks. For example, the communications module 740 may allow the example computing device 705 to send or receive communications signals. Communications signals may be sent or received according to one or more protocols or according to one or more standards. For example, the communications module 740 may allow the example computing device 705 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 740 may allow the example computing device 705 to communicate using near-field communication (NFC), via Wi-Fi™, using Bluetooth™ or via some combination of one or more networks or protocols. Contactless payments may be made using NFC. In some embodiments, all or a portion of the communications module 740 may be integrated into a component of the example computing device 705. For example, the communications module may be integrated into a communications chipset.

Software comprising instructions is executed by the processor 700 from a computer-readable medium. For example, software may be loaded into random-access memory from persistent storage of memory 710. Additionally, or alternatively, instructions may be executed by the processor 700 directly from read-only memory of memory 710.

Figure 6B:
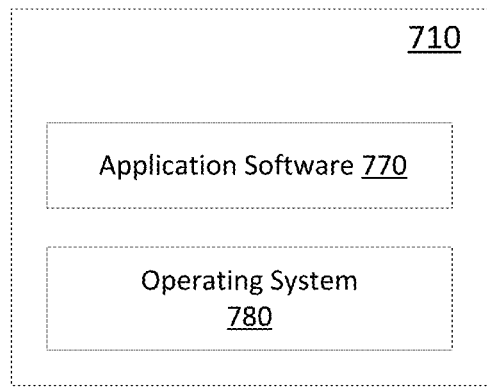
FIG. 6B shows a simplified organization of software components stored in a memory of the computing device of FIG. 6A.
Figure 7:
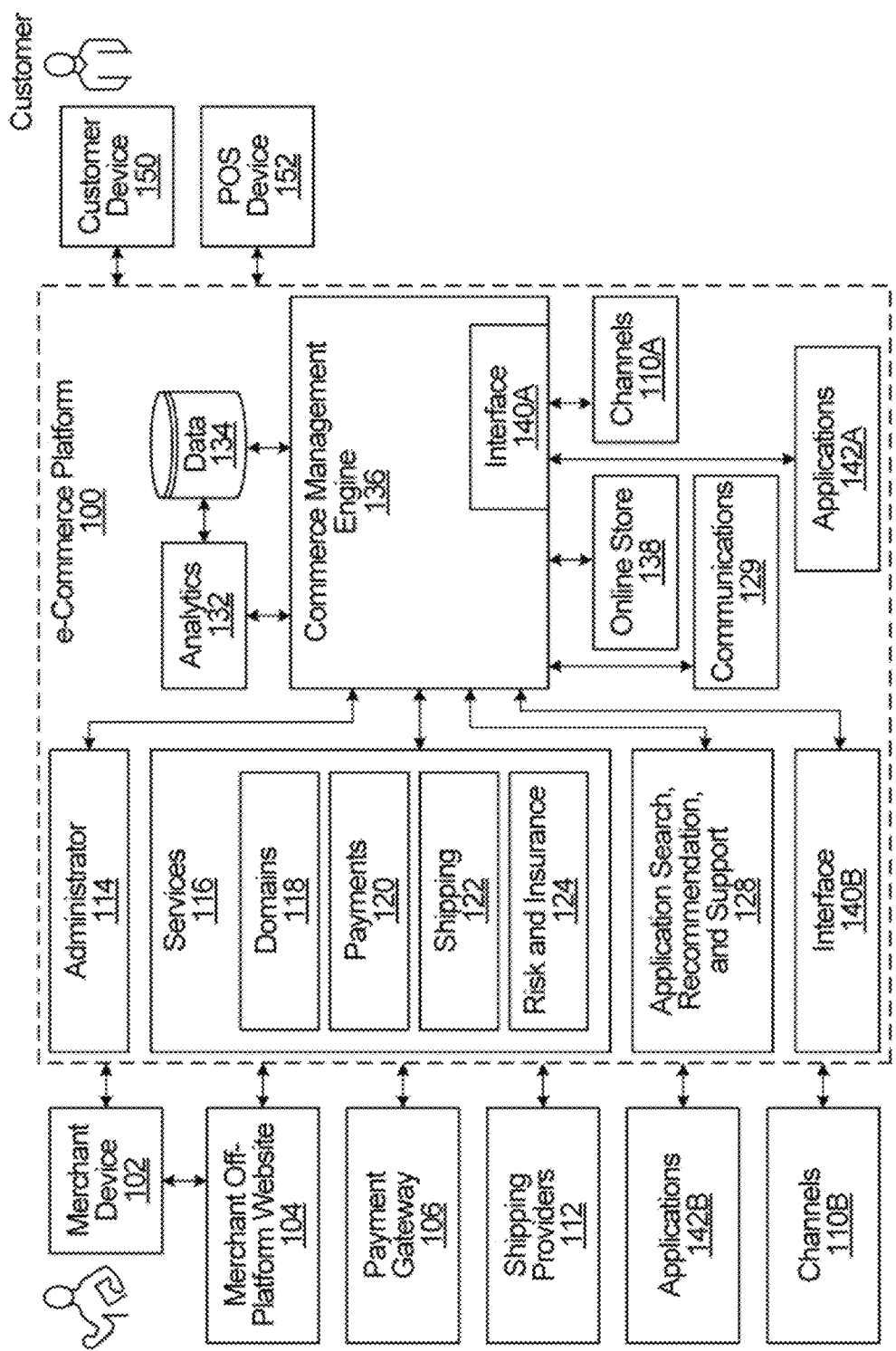
FIG. 7 is a block diagram of an e-commerce platform, in accordance with an example embodiment.

FIG. 6B depicts a simplified organization of software components stored in memory 710 of the example computing device 105. As illustrated these software components include an operating system 780 and application software 770.

The operating system 780 is software. The operating system 780 allows the application software 770 to access the processor 700, the memory 710, the input interface module 720, the output interface module 730, and the communications module 740. The operating system 780 may be, for example, Apple™ OS X, Android™, Microsoft™ Windows™, a Linux distribution, or the like.

The application software 770 adapts the example computing device 705, in combination with the operating system 780, to operate as a device performing particular functions.

Example E-Commerce Platform

Although not required, in some embodiments, the methods disclosed herein may be performed on or in association with an e-commerce platform. An example of an e-commerce platform will now be described.

Figure 8:
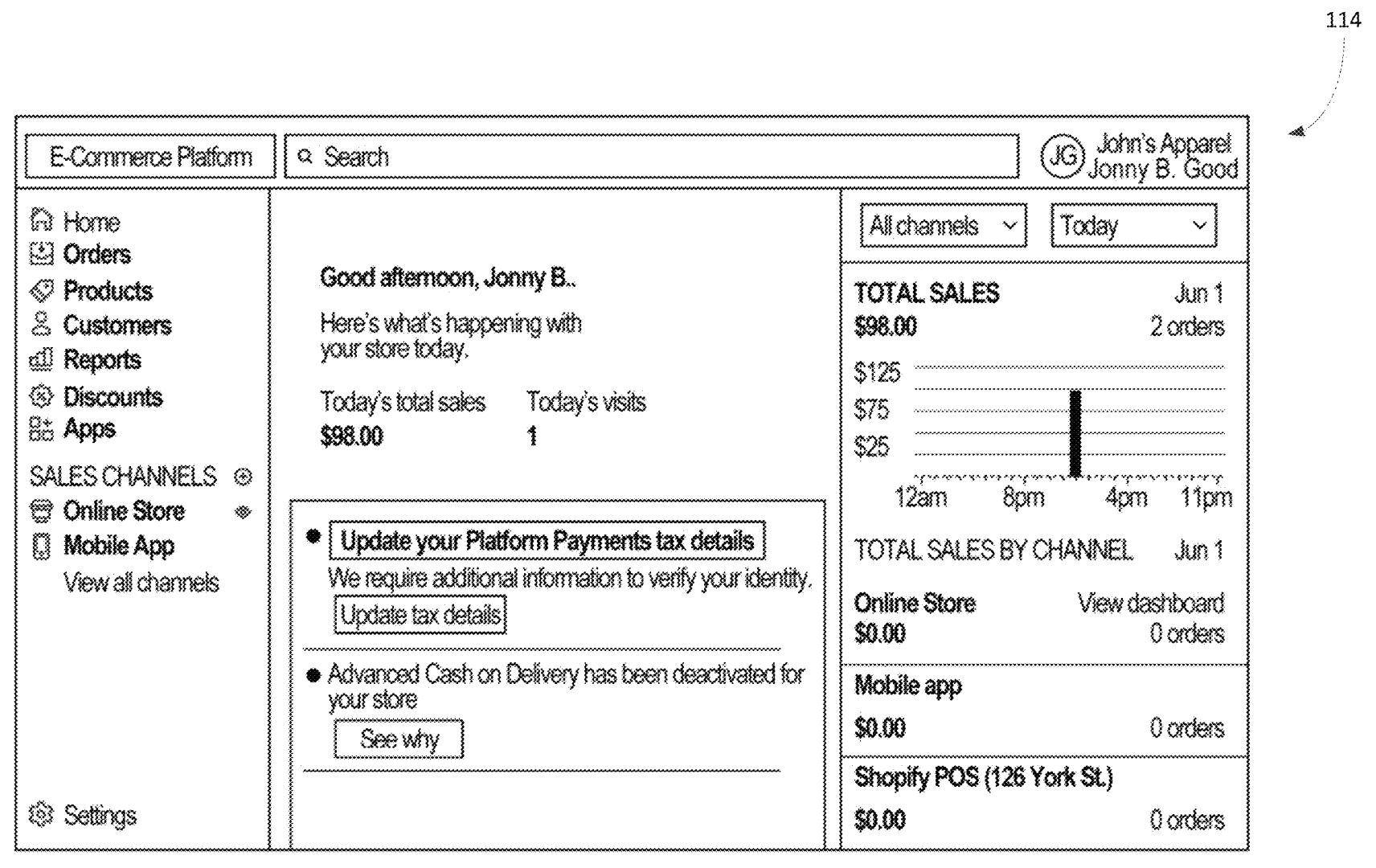

FIG. 8 illustrates an example e-commerce platform 100, according to one embodiment. The e-commerce platform 100 may be exemplary of the e-commerce platform 205 described with reference to FIG. 2. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, additionally or alternatively, be provided by one or more providers/entities.

In the example of FIG. 8, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure, the terms online store and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc.. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the on-line store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme—specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 9 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the on-line store's 138 recent visit or order activity, updating the online store's 138 catalog, managing orders, and/or the like. In some embodiments, the merchant may be able to access the different sections of the administrator 114 by using a sidebar, such as the one shown on FIG. 9. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 8, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
obtaining video data for a video stream;
setting a detected first subject of the video stream as a default object of interest;
detecting, in at least one video frame of the video stream, a first object from a first set of defined objects associated with the video stream; and
in response to detecting the first object in the at least one video frame:
identifying the first object as a current target object associated with the video stream;
detecting a transition cue associated with the first object based on:
determining that the first object is associated with a smaller subject distance to a camera capturing the video stream than a previous target object that is different from the current target object; or
identifying keywords comprising descriptors of the first object in speech detected in audio data associated with the video stream; and
responsive to detecting the transition cue associated with the first object, causing the current target object to be displayed in video focus in at least one subsequent video frame of the video stream by causing transition from displaying a previous target object in video focus for the video stream, to displaying the current target object in video focus for the video stream;

determining that none of the first set of defined objects is detected in a further subsequent video frame of the video stream; and in response to determining that none of the first set of defined objects is detected in the further subsequent video frame, returning video focus to the default object of interest based on setting the first subject as the current target object associated with the video stream.

2. The method of claim 1, wherein causing the transition comprises at least one of:

causing physical movement of an optical sensor capturing the video stream;

performing one or both of a digital zoom and an optical zoom of the at least one subsequent video frame;

selecting at least one optical sensor of a plurality of optical sensors for use in capturing the video stream; or graphically representing a change of an object of interest in the at least one subsequent video frame.

3. The method of claim 1, wherein detecting the first object in the at least one video frame comprises processing video frames of the video stream using an object detection algorithm.

4. The method of claim 1, further comprising receiving, via a client device, user input of an indication of the first set of defined objects associated with the video stream, wherein the first set includes one or more products from a product catalogue.

5. The method of claim 1, wherein detecting the first object in the video stream comprises receiving an object identifier associated with the first object.

6. The method of claim 5, wherein receiving the object identifier associated with the first object comprises receiving user input indicating at least one of:

a selection of the first object;

a time-based condition for transitioning to display of the current target object in video focus; or relative movement of the first object in a scene depicted in the video stream.

7. The method of claim 1, further comprising:

detecting a second object in at least one video frame of the video stream, the second object being one of the first set of defined objects associated with the video stream;

determining that the second object is associated with a higher focus priority than the first object; and in response to determining that the second object is associated with the higher focus priority:

setting the second object as the current target object associated with the video stream; and causing the current target object to be displayed in video focus in at least one subsequent video frame of the video stream.

8. The method of claim 1, wherein causing the current target object to be displayed in video focus comprises applying a blur effect to at least a portion of the at least one subsequent video frame that does not include the current target object.

9. A computing system, comprising:

a processor; and a memory coupled to the processor, the memory storing computer-executable instructions that, when executed by the processor, configure the processor to:

obtain video data for a video stream;

set a detected first subject of the video stream as a default object of interest;

detect, in at least one video frame of the video stream, a first object from a first set of defined objects associated with the video stream; and in response to detecting the first object in the at least one video frame:

identify the first object as a current target object associated with the video stream;

detect a transition cue associated with the first object based on:

determining that the first object is associated with a smaller subject distance to a camera capturing the video stream than a previous target object that is different from the current target object; or identifying keywords comprising product descriptors in speech detected in audio data associated with the video stream; and responsive to detecting the transition cue associated with the first object, cause the current target object to be displayed in video focus in at least one subsequent video frame of the video stream by causing transition from displaying a previous target object in video focus for the video stream, to displaying the current target object in video focus for the video stream;

determine that none of the first set of defined objects is detected in a further subsequent video frame of the video stream; and in response to determining that none of the first set of defined objects is detected in the further subsequent video frame, returning video focus to the default object of interest based on setting the first subject as the current target object associated with the video stream.

10. The computing system of claim 9, wherein causing the transition comprises at least one of:

causing physical movement of an optical sensor capturing the video stream;

performing one or both of a digital zoom and an optical zoom of the at least one subsequent video frame;

selecting at least one optical sensor of a plurality of optical sensors for use in capturing the video stream; or graphically representing a change of an object of interest in the at least one subsequent video frame.

11. The computing system of claim 9, wherein detecting the first object in the at least one video frame comprises processing video frames of the video stream using an object detection algorithm.

12. The computing system of claim 9, wherein the instructions, when executed, further configure the processor to receive, via a client device, user input of an indication of the first set of defined objects associated with the video stream, wherein the first set includes one or more products from a product catalogue.

13. The computing system of claim 9, wherein detecting the first object in the video stream comprises receiving an object identifier associated with the first object.

14. The computing system of claim 13, wherein receiving the object identifier associated with the first object comprises receiving user input indicating at least one of:

a selection of the first object;

a time-based condition for transitioning to display of the current target object in video focus; or relative movement of the first object in a scene depicted in the video stream.

15. The computing system of claim 9, wherein the instructions, when executed, further configure the processor to:

detect a second object in at least one video frame of the video stream, the second object being one of the first set of defined objects associated with the video stream;

determine that the second object is associated with a higher focus priority than the first object; and in response to determining that the second object is associated with the higher focus priority:

set the second object as the current target object associated with the video stream; and cause the current target object to be displayed in video focus in at least one subsequent video frame of the video stream.

16. A non-transitory, computer-readable medium storing computer-executable instructions that, when executed by a processor, configure the processor to:

obtain video data for a video stream;

set a detected first subject of the video stream as a default object of interest;

detect, in at least one video frame of the video stream, a first object from a first set of defined objects associated with the video stream; and in response to detecting the first object in the at least one video frame:

identify the first object as a current target object associated with the video stream;

detect a transition cue associated with the first object based on:

determining that the first object is associated with a smaller subject distance to a camera capturing the video stream than a previous target object that is different from the current target object; or identifying keywords comprising product descriptors in speech detected in audio data associated with the video stream; and responsive to detecting the transition cue associated with the first object, cause the current target object to be displayed in video focus in at least one subsequent video frame of the video stream by causing transition from displaying a previous target object in video focus for the video stream, to displaying the current target object in video focus for the video stream;

determine that none of the first set of defined objects is detected in a further subsequent video frame of the video stream; and in response to determining that none of the first set of defined objects is detected in the further subsequent video frame, returning video focus to the default object of interest based on setting the first subject as the current target object associated with the video stream.

17. The method of claim 1, wherein causing the current target object to be displayed in video focus comprises representing the current target object with visual emphasis in the at least one subsequent video frame of the video stream.

18. The method of claim 1, wherein causing the transition comprises assigning video focus to a specific portion of a video frame and subsequently updating the video focus to be associated with one or more different portions of the video frame.

19. The computing system of claim 9, wherein causing the current target object to be displayed in video focus comprises representing the current target object with visual emphasis in the at least one subsequent video frame of the video stream.

20. The computing system of claim 9, wherein causing the transition comprises assigning video focus to a specific portion of a video frame and subsequently updating the video focus to be associated with one or more different portions of the video frame.

* * * * *